United States Patent [19]

DeNoyer

[11] 4,099,677

[45] Jul. 11, 1978

[54] AUGER FEED GRANULATOR

[75] Inventor: Donald B. DeNoyer, Beloit, Wis.

[73] Assignee: Sterling, Inc., Milwaukee, Wis.

[21] Appl. No.: 531,882

[22] Filed: Dec. 12, 1974

[51] Int. Cl.² .................................... B02C 13/286
[52] U.S. Cl. ........................................ 241/186 A
[58] Field of Search .......... 241/DIG. 18, 82.1, 186 A, 241/246, 247

[56] References Cited

U.S. PATENT DOCUMENTS

| 2,195,815 | 4/1940 | Hanna | 241/247 |
| 3,625,138 | 12/1971 | Shinn | 241/186 A |
| 3,653,420 | 4/1972 | Viene | 241/82.1 X |
| 3,795,369 | 3/1974 | Moser | 241/82.1 |
| 3,904,136 | 9/1975 | DeNoyer | 241/186 A |

Primary Examiner—Granville Y. Custer, Jr.
Attorney, Agent, or Firm—Dirk J. Veneman; Michael L. Gill; Gerald A. Mathews

[57] ABSTRACT

Unobstructed free discharge from the end of an auger into a granulator assembly is achieved by supporting the auger shaft cantilever fashion and effecting driving of the shaft at the end of the conveyer trough remote from the end of the trough which discharges into the granulator assembly. This eliminates wrapups or binding of thermoplastic material, especially long flexible pieces fed by the auger to the granulator assembly.

7 Claims, 4 Drawing Figures

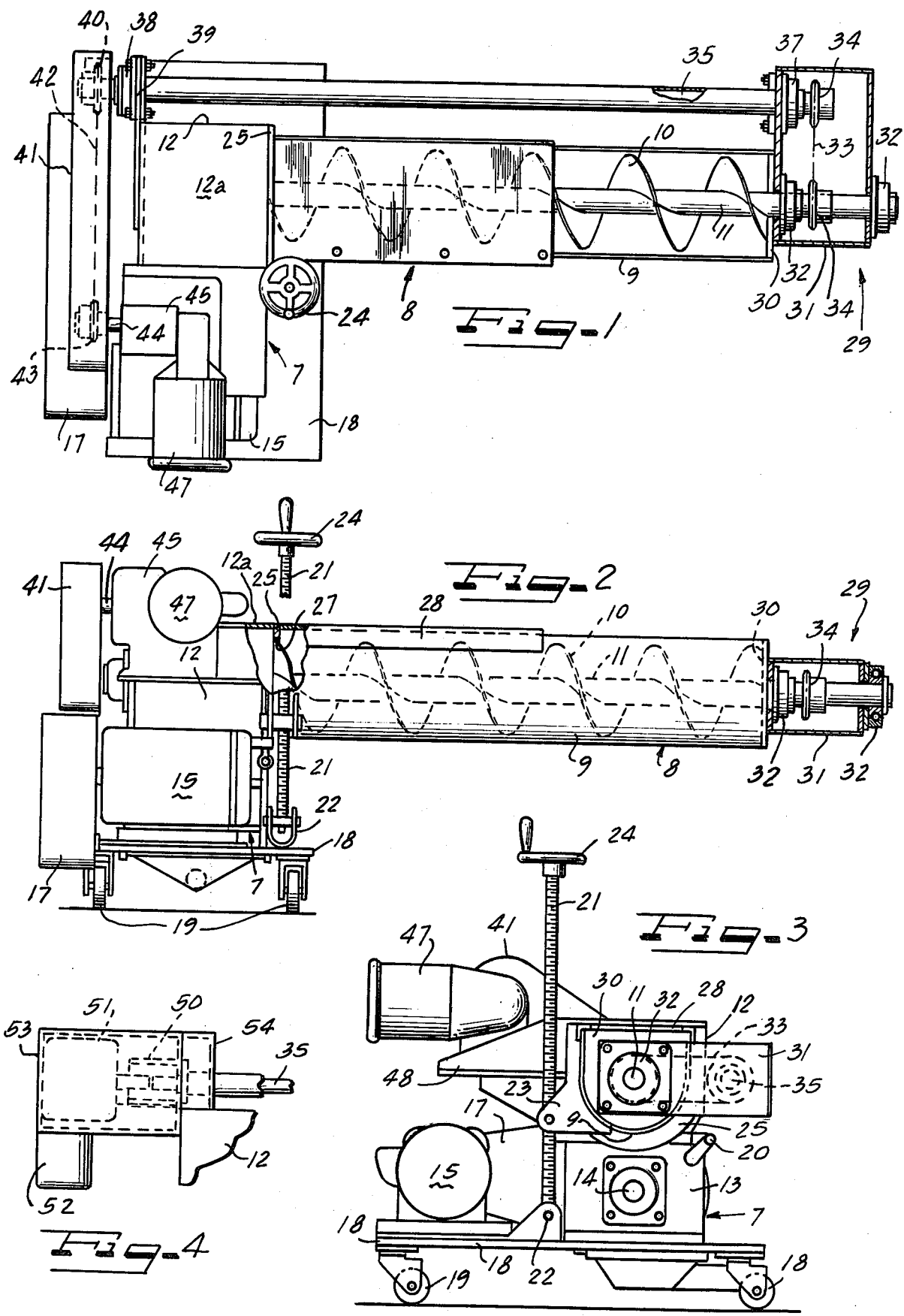

AUGER FEED GRANULATOR

BACKGROUND OF THE INVENTION

This invention relates generally to auger feed granulators for plastic materials or the like, such as scrap originating with plastic molding apparatus, such granulators reconditioning the plastic material for reuse.

Granulators of this type are well known, a representative example being shown in U.S. Pat. No. 3,795,369, assigned to the same assignee as the present application. Such granulators include a granulator assembly having a bladed granulating mechanism with a hopper positioned over the granulating mechanism for recieving material to be granulated from a conveyer comprising a trough and an auger working in the trough to feed material deposited in the trough to the granulator assembly.

A major problem with such granulators is the tendency of long pieces or runners of thermoplastic material to wrap around the feed or discharge end of the auger and effect a binding action between the auger and the hopper wall on which the adjacent end of the auger shaft has customarily been journaled. This causes jamming and binding of the auger and prevents discharge of the material into the cutting chamber. Various expedients have heretofore been suggested to solve the problem, such as providing a disk and blocking bar pursuant to said U.S. Pat. No. 3,795,369, providing a stationary bar parallel with the auger axis and close to the outer diameter of the auger flights in the cutting chamber, notching the auger flights to sever the material, eliminating the auger flights in the cutting chamber and having only the bare auger shaft spanning the cutting chamber, sometimes with strippers provided to clear the bare shaft of wrapups. However, the various attempts at solving the problem as listed have not been satisfactory when long flexible runners are fed by the auger, and hot runners in particular.

SUMMARY OF THE INVENTION

It is therefore a principal object of the present invention to overcome the stated problem by the provision of a new and improved arrangement which will effectively eliminate wrapups and binding at the cutter chamber end of the auger.

According to features of the invention, there is provided in an auger feed granulator having a granulator assembly and a conveyer assembly including a trough and an auger provided with an axial shaft, said trough discharging at one end into the grandulator assembly, said conveyor assembly being supported from said granulator assembly in cantilever fashion, bearing means supporting the auger shaft at the end of the trough which is remote from the granulator assembly, i.e. at the inlet end of the auger the auger including the distal end of its shaft terminating adjacent to the dischage end of the trough to effect free discharge of material from the conveyer into the granulator assembly, and the auger being rotatably driven by drive means connected to the auger shaft at its proximal or inlet end portion.

BRIEF DESCRIPTION OF THE DRAWINGS

Other objects, features and advantages of the invention will be readily apparent from the following description of certain preferred embodiments thereof, taken in conjunction with the accompanying drawing although variations and modifications may be effected without departing from the spirit and scope of the novel concepts embodied in the disclosure, and in which:

FIG. 1 is a top plan view of a representative form of auger feed granulator embodying features of the invention.

FIG. 2 is a side elevational view of the auger feed granulator.

FIG. 3 is an end elevational view of the granulator looking toward the left end in FIG. 2; and FIG. 4 is a fragmentary illustrative view of a modified auger driving arrangement.

DETAILED DESCRIPTION OF THE PREFERRED EMBODIMENTS

On reference to FIGS. 1, 2 and 3, a representative auger feed granulator comprises a granulator assembly 7 and a conveyor assembly 8 including a trough 9 complementary to a helical screw type auger 10 extending throughout the length thereof and provided with an axial drive shaft 11. At one end the trough 9 discharges into the granulator assembly through a hopper 12 located over the granulator assembly 7 which comprises, as is customary, a housing 13 having therein cutter blades including a bladed motor (not shown) carried on a shaft 14 and driven as by means of a rotor 15 through a transmission within a housing 17, and all supported on a platform 18 desirably provided with casters 19 for mobility. Desirably, the trough 9 is fixedly secured cantilever fashion to the hopper 12 which normally rests on the top of the open top granulator assembly housing 13 and is connected thereto at one side by pivot means 20 enabling the hopper together with the conveyor 8 to be swung into clearance relation to the granulator assembly 7 by means of a screw shaft 21 pivotally attached at its lower end by means 22, coupled to the side of the hopper 12 opposite to the pivot 20 by screw coupling follower means 23 and rotatable as by means of a hand wheel 24 at its upper end.

Cantilever attachment of the discharge end of the conveyer trough 9 to the housing providing the hopper 12 is desirably effected by means of a mounting plate 25 fixed to the inlet side of the hopper 12 and provided with a discharge opening 27 of a size to permit free discharge of material from the trough 8 as propelled by the auger 10. By preference, a removable cover plate 28 covers over the downstream or delivery end portion of the trough 8, leaving the opposite or distal end portion of the trough upwardly open for receiving material to be conveyed to the hopper for delivery into the granulator assembly 7.

According to the present invention, the auger 10 is supported cantilever fashion through the shaft 11 within the trough 9 Bearing structure 29 supports the proximal end portion of the shaft 11 at the distal or inlet end of the trough 9. The distal end of the trough 9 is closed by fixed end plate 30 through which the proximal end portion of the shaft 11 extends rotatably into and through a bearing bracket housing structure 31 which is rigidly fixed on, is comprised in part by and projects outwardly from the trough end plate 30. Rotary mounting of the proximal end portion of the shaft 11 is by means of a pair of suitably axially spaced bearings 32 carried by the housing 31. Through this arrangement, the conveyor assembly i.e. the shaft 11 and thereby the auger 10 is firmly rotatably supported to extend cantilever fashion from the granulator assembly and with the distal end of the auger flight and the distal end of the shaft 11 terminating coextensively at the proximal or discharge end of the trough 9, at the opening 27 into the hopper 12 and without any material projection of the auger, and especially the shaft 11, into or across the hopper 12. This assures completely unobstructed, unhampered discharge of material from the conveyor 8 into the hopper 12 and then into the granulator assembly 7, thoroughly avoiding wrapups or binding as experienced with prior arrangements where the auger flights and/or shaft extend above the hopper over the granulating chamber.

Rotary driving of the auger 10 is effected by means connected to the proximal end portion of the shaft 11. One such means comprises an endless flexible driving element 33 such as a drive chain trained over a sprocket wheel 34 keyed to the end portion of the shaft 11 between the bearings 32 and over a sprocket 34 keyed to an end portion of a jack shaft 35 mounted on an axis parallel to the axis of the auger shaft 11, in spaced relation along one side of the trough 9. At the housing 31, the drive shaft 35 is journaled in a bearing 37. At its opposite end portion, the jack shaft 35 projects through a bearing 38 suitably supported on a bracket 39 mounted on the outside of the hopper 12 and carrying a pulley or sprocket 40 within transmission housing 41 and over which is trained a flexible endless transmission element 42 also trained over a sprocket 43 keyed to a transmission shaft 44 coupled by suitable transmission gear means in a housing 45 on which is mounted a drive motor 47 mounted on a bracket 48 carried by the hopper 12 at the opposite side from the jack shaft 35. Through this arrangement nicely balanced load distribution is effected having regard to and facilitating shifting of the conveyer assembly 8 about the pivotal mounting 20 as by operation of the screw 21 when it is desired to gain clear access into the granulator assembly 7.

In a modified arrangement as shown in FIG. 4, the jack shaft 35 may have its end which is journaled at the hopper 12 attached as by coupling means 50 to a transmission gear assembly 51 driven by a motor 52, all supported on or within a housing 53 mounted on the same side of the hopper 12 as the jack shaft 35, and with the aid of a bracket 54 mounted on the hopper.

In addition to the new and improved results and advantages pointed out hereinabove, attention is directed to the fact that versatility and usefullness of auger feed granulators is substantially improved and extended. Granulators without the auger feed feature located alongside a press for receiving scrap are provided with a hopper feed directly above and to the grinding rotor. Prior auger feed granulators presented difficulties to serving in this capacity because the auger and/or shaft extended above the rotor and obstructed direct access to the rotor so that an auxiliary hopper was required above the auger feed opening for so-called beside the press operation. By virtue of the present invention, however, where the hopper area over the grinding rotor is entirely free and unobstructed, the new and improved auger feed granulator can be readily used not only for auger feed to the hopper, but the hopper 12 of the unit can be employed in the same fashion as a standard hopper feed for beside the press operation by simply opening or removing a cover 12a. In addition, an auger feed granulator embodying features of the present invention can be used in a dual capacity to receive scrap from under the press into the open distal end portion of the trough 9, as well as and at the same time with the hopper 12 located for beside the press operation with the cover 12a open or removed. Thereby the unit is capable of dual utility.

It will be understood that variations and modifications may be effected without departing from the spirit and scope of the novel concepts of this invention.

I claim as my invention:

1. In an auger feed granulator for conveying and granulating plastic material having a granulator assembly and a conveyor assembly, said conveyor assembly including a trough and an auger, the trough and auger each having inlet and discharge ends, said discharge ends communicating with the granulator assembly, the improvement comprising:

said conveyor assembly being supported from said granulator assembly in a cantilevered manner;

power means being supported from said granulator assembly in a cantilevered manner;

said power means include a jack shaft extending in spaced parallel relation along one side of said trough, and means associated with said granulator assembly comprising a power source coupled in driving relation to said jack shaft;

said power source comprising a motor supported by said granulator assembly;

said power means drivingly connected to said auger through said jack shaft at the inlet end thereof;

said auger at the discharge end thereof terminating substantially adjacent to the entrance of the granulator assembly, to effect free discharge of material from the conveyor assembly into the granulator assembly.

2. A granulator according to claim 1, and further including bearing means, said bearing means rotatably supporting the inlet end of the auger and comprising axially spaced bearings carried by said trough.

3. A granulator according to claim 2, and having a housing structure encompassing said axially spaced bearings.

4. A granulator according to claim 2, wherein said power means are connected to said inlet end of the auger.

5. A granulator according to claim 1, including a hopper structure to which the outlet end of the tough is attached and having an opening into the hopper structure through which the trough discharges into the granulator assembly, said auger terminating at said opening.

6. A granulator according to claim 1, wherein said trough has a closure plate at the inlet end comprising part of a bearing bracket housing structure, said bearing means comprising axially spaced bearings supported by said bracket housing structure and journaling said auger.

7. A granulator according to claim 6, wherein said power means includes a jack shaft having one end portion journaled on said bracket housing structure, and means coupling said jack shaft with said inlet end of said auger within said bracket housing structure.

* * * * *